United States Patent [19]

Koda

[11] 4,407,655
[45] Oct. 4, 1983

[54] DEVICE FOR SIMULATION OF PROJECTED IMAGE

[75] Inventor: Yoshio Koda, Nagoya, Japan

[73] Assignees: Agency of Industrial Science & Technology; Ministry of International Trade & Industry, both of Tokyo, Japan

[21] Appl. No.: 353,472

[22] Filed: Mar. 1, 1982

[30] Foreign Application Priority Data

Mar. 18, 1981 [JP] Japan .................................. 56-38879
Jul. 10, 1981 [JP] Japan ................................ 56-108555

[51] Int. Cl.³ ............................................. G09B 19/00
[52] U.S. Cl. ...................................... 434/219; 434/91
[58] Field of Search ........................... 434/219, 90, 91

[56] References Cited

U.S. PATENT DOCUMENTS 254,178 2/1882 Van Lith .......................... 434/91 X
1,771,903 7/1930 Soth ................................. 434/90 X
2,571,613 10/1951 Rissland ............................... 434/91

Primary Examiner—William H. Grieb
Attorney, Agent, or Firm—Kurt Kelman

[57] ABSTRACT

Disclosed is a device for simulation of projected image comprising a support member, a frame and an eye member attached respectively to the opposite ends of the support member. The relation between the size of the frame and the distance from the frame to the eye hole in the eye member is similar to the relation between the size of the projected image and the distance from the surface of the projected image to the viewer's seats. When the user looks through the eye hole at a given original and finds the contents of the image discernible, he is assured that a projection film to be produced by photographing the image enclosed with the frame, on being projected on a screen, will reproduce an image amply discernible by the viewers.

11 Claims, 11 Drawing Figures

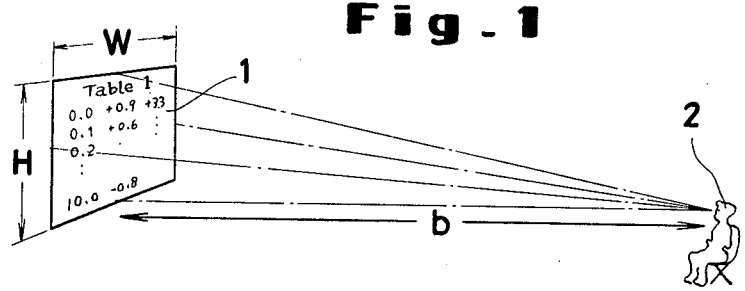
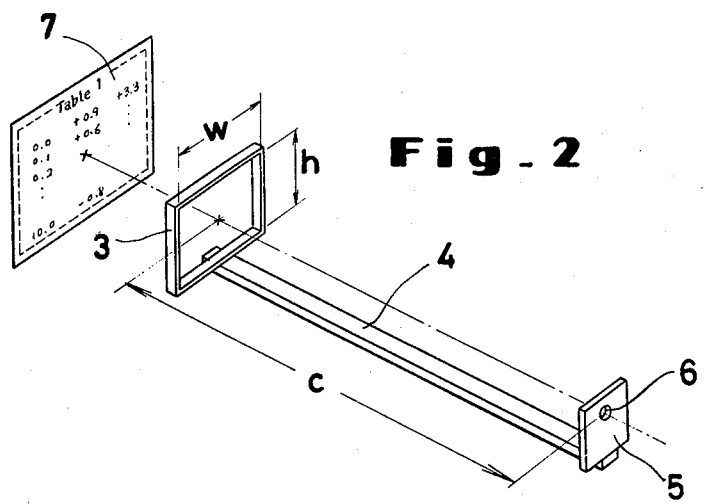
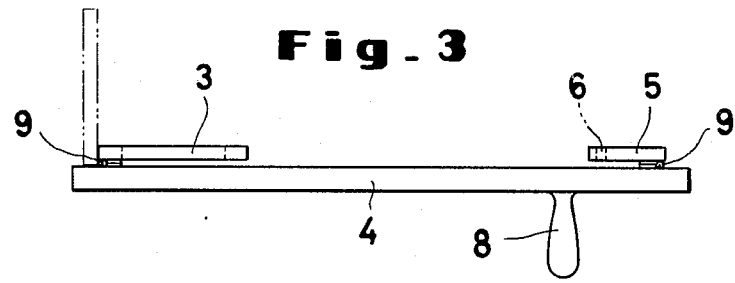
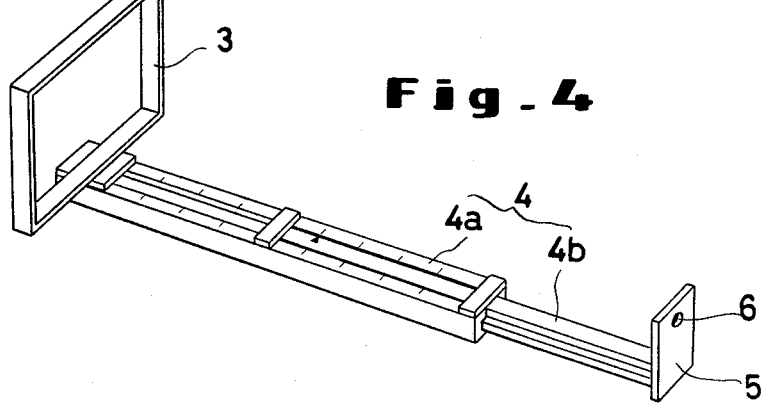

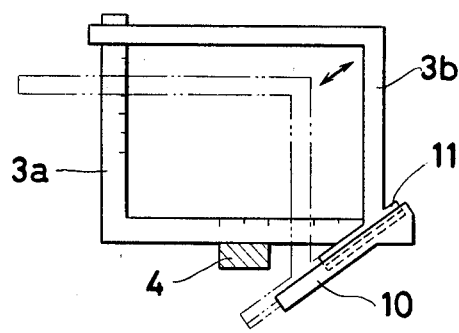
Fig_5(A)
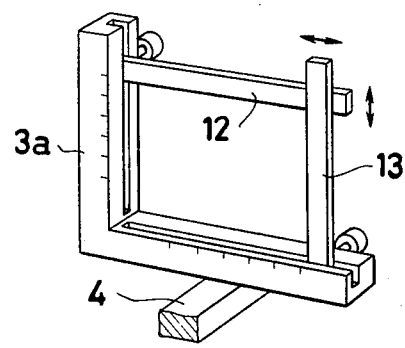
Fig_5(B)
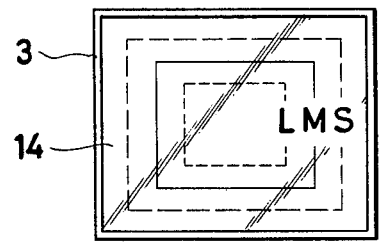
Fig_6(A)
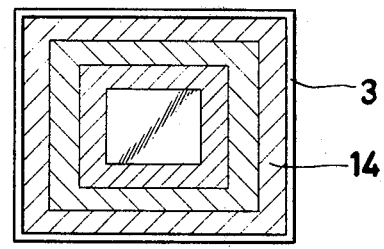
Fig_6(B)
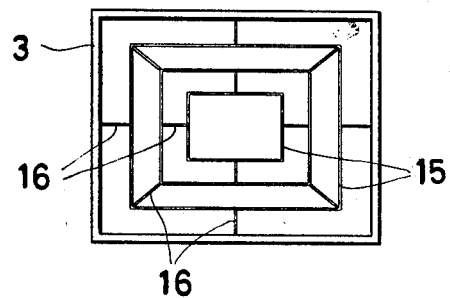
Fig_7(A)
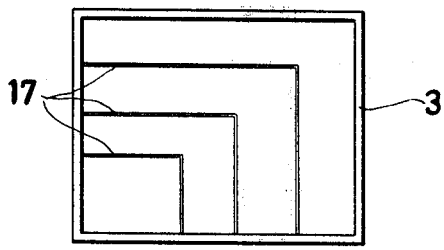
Fig_7(B)
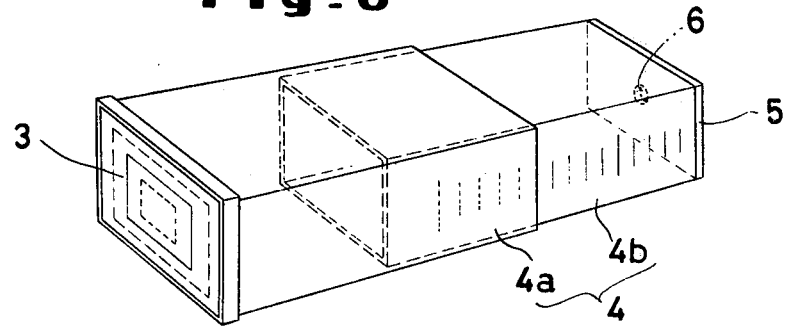
Fig_8

DEVICE FOR SIMULATION OF PROJECTED IMAGE

BACKGROUND OF THE INVENTION

This invention relates to a device for simulation of a projected images. More particularly, this invention relates to a device which is used to view a picture or writing to be photographed on a slide film or a frame of a motion picture film (hereinafter referred as a "projection film") for the purpose of determining whether or not the photographed image on the projection film will, upon being projected on a screen by a projector, produce a picture discernible or writing legible by the viewers.

In the production of slides, motion pictures, etc., the size of pictures or writing (hereinafter referred as a "photographic image") within the frames must be determined to ensure that the photographic image, on being projected on a screen, will produce a projected image with clarity enough for pertinent details thereof to appear readily discernibly or legibly. This determination of size requires considerable experience and know-how. This is evidenced by the fact that a number of special books have been published concerning this technique. For a person who lacks experience and know-how, however, it is no easy thing to use these techniques in accordance with the instructions given in a book. Particularly, where a similar example is not specifically illustrated, an inexperienced person will be compelled to use the trial-and-error method.

Cameras, projectors, and other photographic equipment have come into such wide use that even amateurs frequently make and project motion-picture films. Among these are scientific researchers who produced their own slides or films for technical reports. It is only natural that such people should desire a device that would allow them to easily produce slides and motion pictures which when projected show the pertinent data, figures etc. in a size clearly readable and discernible by the audience.

SUMMARY OF THE INVENTION

An object of this invention is to provide a device for simulation of projected images which enables even a person of little experience and know-how to determine quickly whether or not a particular photographic image he is considering including within a frame of film will produce a readily discernible projected image on a screen.

To accomplish the object described above according to this invention, there is provided a device for simulation of projected images which comprises a support member, a frame of prescribed dimensions disposed at one end of the support member, and an eye plate containing an eye hole and disposed at the other end of the support member. The dimensions of the frame and the distance between the frame and the eye plate are fixed by the area of the image to be projected on the screen and the distance from the projector screen to the position at which the image produced on the screen is observed advantageously by viewers.

In using the device constructed as described above, the user peers through the eye hole at a given original to be photographed. If the original (or part thereof) appearing within the frame is discernible, the photographed image of the framed portion will produce a discernible image on the projector screen. If the portion appearing within the frame is not discernible, then the simulation device must be moved toward the original until the portion appearing within the frame becomes discernible. At that point, the user produces a photographic image on a frame of projection film so as to include in the frame the whole of the portion appearing within the frame and only this portion. The frame of projection film thus produced will produce a readily discernible image when projected on a screen insofar as the projection conditions are identical with those originally presumed.

The other objects and characteristics of this invention will become apparent from the further disclosure of the invention to be made hereinbelow with reference to the accompanying drawing.

BRIEF EXPLANATION OF THE DRAWING

FIG. 1 is an explanatory diagram illustrating the operating principle of the device for simulation of projected image of the present invention.

FIG. 2 is a perspective view of the basic construction of the simulation device of this invention.

FIG. 3 is a front view illustrating another embodiment of the simulation device of this invention.

FIG. 4 is a plan view illustrating yet another embodiment of the simulation device of this invention.

FIG. 5(A) is an explanatory diagram illustrating a second embodiment of the frame for use in the simulation device of the present invention.

FIG. 5(B) is an explanatory diagram illustrating a third embodiment of the frame for use in the simulation device of this invention.

FIG. 6(A) is an explanatory diagram illustrating a fourth embodiment of the frame for use in the simulation device of this invention.

FIG. 6(B) is an explanatory diagram illustrating a fifth embodiment of the frame for use in the simulation device of this invention.

FIG. 7(A) is an explanatory diagram illustrating a sixth embodiment of the frame for use in the simulation device of this invention.

FIG. 7(B) is an explanatory diagram illustrating a seventh embodiment of the frame for use in the simulation device of this invention.

FIG. 8 is a perspective view illustrating a further embodiment of the simulation device of this invention.

DESCRIPTION OF THE PREFERRED EMBODIMENT

Referring to FIG. 1, the projected image 1 reproduced on a screen from a projection film has a height of "H" and a width of "W" and the distance from the projected image 1 to a position 2 at which the projected image can be advantageously observed from the average viewing position indicated as "b".

Generally, the distance "b" can be increased and the number of viewers can be consequently increased in proportion as the area of the projected image is enlarged. When the image to be projected contains letters, symbols, graphs, etc. drawn in fine lines, the viewers of the projected image will not be able to thoroughly comprehend the projected information unless the size of the projected image is amply increased or the distance "b" is shortened. For a person who has little experience in the production of projection films, the arrangement of letters and symbols within a frame of projection film, the selection of the size of the individual letters and symbols and the thickness of their component lines, and the selection of the thickness of lines and curves used in drawing a graph in a frame of projection film turn out to be difficult problems. If these points are not thoroughly considered, however, the projected images may not be easily discernible for the viewers.

This invention relates to a device which enables its user to determine the size in which a given photographic image should be contained within a frame of projection film in order to produce a projection film which when projected will produce on the screen a projected image clearly discernible by the viewers, on condition that the height "H" and the width "W" of the projected image 1 reproduced on the screen from the projection film and the distance "b" from the projected image (screen) 1 to the position at which the projected image is to be advantageously observed on the average by viewers are already known.

The basic construction of the simulation device of this invention will be described below with reference to FIG. 2.

As illustrated in FIG. 2 a rectangular frame 3 is disposed at one end of a support member 4 and an eye member 5 provided with an eye hole 6 is disposed at the other end of the support member 4, with the rectangular frame 3 and the eye member 5 positioned parallelly to each other and substantially perpendicularly to the support member 4. For the sake of the accuracy of this device, the center of the frame 3 and that of the eye hole 6 are desired to fall in one and the same axis parallel to the support member 4. As regards the inside dimensions of the rectangular frame 3, let "c" stand for the horizontal distance from the point at which the eye is positioned at the eye hole 6 to the outer surface of the frame, and the height "h" of the frame is fixed at the value obtained by multiplying the height "H" of the projected image by the distance "c" and dividing the resultant product by the distance "b" from the projected image to the viewers, i.e., (H·c/b) and the width "w" of the frame is fixed at the value obtained by multiplying the width "W" of the projected image by the distance "c" and dividing the resultant product by the distance "b", i.e. (W·c/b). The shape of the support member 4 is optional insofar as it is constructed to support firmly the frame at one end thereof and the eye member at the other end thereof. The support member 4 may be in a cylindrical shape as illustrated in FIG. 8. The eye hole 6 in the eye member is only required to have a size large enough for one eye of the user to look therethrough at a given original.

Now, the procedure to be followed in simulating a given image by use of the simulation device of the aforementioned construction will be described. It is assumed that the original is to be photographed on a slide. The simulation device of this invention is employed to determine whether or not the image 7 of the original to be photographed on the slide will reproduce a projected image clearly enough for the letters and other contents thereof to be amply discerned from the viewers' seats positioned at an average distance from the screen. Specifically, this determination is effected by first placing this device in a direction in which the optical axis of this device coincides with the center of the original and then adjusting the relative position of the simulation device thereby bringing the outer boundary of the frame of the original 7 into alignment with the inner edge of the frame 3 as observed through the eye hole 6. In this case, the frame 3 and the original 7 are positioned so that their surfaces run parallelly to each other. If the contents of the original as observed through the eye hole 6 are discernible, then the user is assured that the projected image produced on the screen will be similarly discernible. If the contents of the original are not discernible, then the projected image will also be undiscernible.

When the contents of the original are not discernible, this device is moved toward the original 7 or the original is moved toward the device until the contents become amply discernible as observed through the eye hole 6. The portion of the original which is enclosed in the frame 3 is recorded or committed to memory. The user now produces a projection film containing the whole of the portion of the original enclosed in the frame and only this portion. When the projection film thus produced is mounted on a projector and projected in a predetermined enlarged size on a screen, there is reproduced an image which is readily discernable by viewers having visual acuity at least equivalent to the user's and seated at a distance "b" from the projected image.

If the contents of the original as observed within the frame through the eye hole are far more than easily discernible, the tester is moved back to a suitable position so that the original is seen to fill a balanced and conspicuous portion of the entire area of the frame. At this position, the user produces a projector film of this portion. Optionally, the user may add further writing etc. to the original in a clearly discernible form within the boundary of the frame.

There is the possibility that when two persons having widely different degrees of visual acuity use the simulation device in producing a projection film from one and the same image, photographed image produced by one will differ from that of the other. The individual difference due to the users' visual acuity can be eliminated by a proper measure such as giving the device a proper preadjustment so that the distance from the frame to the eye hole may be proportionally shortened when a user has a lower degree of visual acuity than the standard or proportionally lengthened when another user has a higher degree of visual acuity than the standard, for example. Thus, the user's visual acuity offers no particular problem to the operation of the simulation device. Further, since the simulation device uses no lens, persons using and not using eye glasses can use the tester in entirely the same way.

The position at which viewers can comfortably observe the projected image on the screen is generally selected slightly toward the rear from the center of the room relative to the position of the screen. The expression "position suitable for observation of the projected image" as herein used means the position at which any spectator whose visual acuity is at least equal to the visual acuity of the person who has produced the projector film can easily observe and discern the projected image. A spectator whose visual acuity happens to be inferior to that of the producer of the projector film can observe and discern the projected image by taking a seat closer to the screen than the "suitable" position. When the suitable position is fixed at the rearmost part of the room relative to the position of the screen, all spectators of varying degrees of visual acuity can observe and discern the projected image by taking seats closer toward the screen in proportion to the poorness of their vision.

With the projector image tester of this invention, when the user finds the original observed through the eye hole to be perfectly discernible, he proceeds to photograph the large in that particular aspect and produce a projection film by exposing the film in a camera to the image and then developing and fixing the image. When the photographed image on the projection film is reproduced on the screen by the projector and the projected image is observed from a viewer's seat situated at an average distance from the screen, the discernibleness of the projected image in a strict sense is different from that of the original observed formerly through the eye hole. The recent technical advancement in photography, however, has been such that a projected image having practically no conceivable difference of discernibleness from the real image can be easily obtained by selecting the camera and film and using and treating them faithfully as directed to produce a projection film and projecting the projection film by a proper projector on a screen as enlarged to a prescribed size.

FIG. 3 illustrates a modification of the projector image tester of FIG. 2 as improved to ensure greater convenience of handling. From the lower side of the support member 4, a grip bar 8 of a suitable shape is extended. The frame 3 and the eye member 5 are fastened each through the medium of a hinge 9 to the support member 4. When the projector image tester is not in use, the frame and the eye member are folded over the support member as illustrated so as to be stowed away or carried around conveniently. This modification enjoys enhanced portability when the grip bar 8 is designed to be freely detachable from the support member or readily foldable over the support member.

The inside dimensions of the frame and the distance "c" from the frame to the eye member are determined by the size of the projected image produced on the screen and the distance "b" from the screen to the seat of the viewer as described above. Let us assume that a screen having a height "H" of 0.7 m and a length "W" of 1 m is set at a distance of about 7 m from the suitable position for observation. Let us further assume that the simulation device is such that the distance "c" from the frame to the eye member is 150 mm. Then, the vertical size "h" of the frame is 700×150/7000=15 and the horizontal size "w" thereof is 1000×150/7000=21.4. To produce a projection film capable of reproducing a perfectly discernible projected image on the screen, therefore, the frame fastened to the support member at a distance of 150 mm from the eye member is required to have a height of about 15 mm and a length of about 21.4 mm. When the same screen is set up at a distance of about 5 m from the suitable position for observation and the simulation device satisfying all the conditions mentioned above and having the frame of identical dimensions is used, a similar projection film can be produced by decreasing the distance "c" between the frame and the eye member to about 107 mm. For this purpose, the support member 4 is constructed by combining a sliding member 4a provided at one end thereof with the eye member 5 and a receiving member 4b provided at one end thereof with the frame 3. By fitting the sliding member 4a in the receiving member 4b so that the former will be smoothly slid inside the latter, the distance between the frame and the eye member can be changed to a desired value. Thus constructed, the projector image tester offers increased utility. When a scale is graduated on one 4a of the members and a reference mark is inscribed on the other member 4b against the scale, the distance separating the frame and the eye member can be directly read out of the scale as shown in FIG. 4. Optionally, means for fixing the two members relative to each other may be provided as required.

Instead of adjusting the distance between the frame and the eye member as described above, the area enclosed by the frame may be changed to the same end. This method basically calls for preparation of a number of gradually varied dimensions, which are each designed so as to be detachable by some suitable means to the support member. Once the area of the projected image on the screen and the distance "b" from the screen to the suitable position for observation are fixed, the distance between the frame and the eye member and the inside sizes of the frame are calculated in accordance with the formulas mentioned previously. Then, the simulation device to be used for the production of the projection film will be obtained by selecting the particular frame satisfying the sizes found by the calculation and fastening this frame to the support member.

The method just mentioned, however, necessitates preparation of a number of frames. The plurality of frames will not necessarily include a frame whose dimensions exactly conform to the sizes found by the calculation.

To avoid this disadvantage, the frame 3 may be composed of two L-shaped members 3a, 3b which are diagonally opposed to each other as illustrated in FIG. 5(A). At the terminal of the horizontal arm of the basic L-shaped member 3a which is fixed to the support member 4, there is provided a guide rail 10 disposed parallelly to the diagonal line. The other L-shaped member 3b is provided with a guide plate 11 adapted to be fitted and slid in the guide rail 10. The area enclosed with the frame, therefore, can be changed to a desired value by suitably sliding the guide plate 11 in the guide rail 10 to a prescribed position. At this position, the guide plate is fastened to the guide rail by suitable means (not shown).

Yet another embodiment of the frame is illustrated in FIG. 5(B). The vertical and horizontal arms of the basic L-shaped member 3a which is fixed to the support member 4 are respectively provided with arm members 12, 13 disposed perpendicularly to the corresponding arms. The arm members 12, 13, though formed separately of the respective vertical and horizontal arms, are adapted to be slidably attached vertically to the arms. The area enclosed with the frame can be freely changed by sliding the arm members 12, 13 to prescribed positions on the arms. In either of the last two embodiments, scales graduated one each on the vertical and horizontal arms of the basic L-shaped member enable the user to find the area enclosed with the frame at a glance.

When the frame incorporates movable arms as in the preceding embodiments, there ensues the possibility that the center of the eye hole in the eye member may not coincide with the center of the frame. The deviation which occurs between the two centers in this case offers no hindrance from the practical point of view because there exists a fair distance between the eye hole and the frame and further because the simulation device is used primarily for the purpose of determining in advance the discernibleness with which the image will be reproduced on the screen.

Optionally, a transparent plate made of glass or plastics and having boundaries corresponding to the prescribed areas of projection inscribed on the surface thereof may be used as the frame. To be more specific, a transparent plate 14 is set within the frame 3 and a plurality of boundaries of gradually varying areas are formed on the transparent plate as shown in FIG. 6. The facilitate ready distinction among the boundaries, the boundaries may be varied in thickness of line or in pattern or they may be indicated by different symbols (FIG. 6(A)). Otherwise, the areas intervening between the successive boundaries may be dyed with different transparent colors such as red, green, yellow, etc. (FIG. 6(B)).

The frame constructed as described above is attached fast to the leading end of the support member. Once the size of the projected image and the size of the room used for the projection are fixed, the distance between the frame and the eye member is determined and the area enclosed by the frame is found in accordance with the aformentioned formula. Then, the particular boundary whose area most closely approximates the area found by the calculation is used for the production of the projection film.

In the place of the transparent plate used in the preceding embodiment, a plurality of frames 15 of gradually varying sizes may be formed with wires of metal or plastic, with the frames supported in position in the order of increasing size by supporting members 16 as illustrated in FIG. 7(A). If the supporting members 16 thus used are so numerous as to obstruct the field of vision, then a plurality of L-shaped members 17 of gradually varying sizes may be made of metal or plastic, with their ends fastened to the frame 3 as illustrated in FIG. 7(B). These frames can be easily formed by molding plastics, etc.

The embodiments cited so far have been described as using rectangular frames. When necessary, they may be formed in any other shape such as a circle or an ellipse.

When the frame 3 constructed as shown in FIG. 6 or FIG. 7 is used, the simulation device can be made to enjoy ease of handling by forming the support member in the shape of a cylinder having an inside diameter equaling the outside dimensions of the frame, fitting the frame at one end of this cylindrical support member, fastening a transparent plate and an eye member to the other end of the support member, and applying an opaque paint to the transparent plate except for the eye hole or fastening an opaque plate containing an eye hole instead. In the embodiment just described, the frame 3 and the eye member 5 are attached separately to the end planes of two cylindrical members 4a, 4b having slightly different sizes from each other. By fitting the free end sides of the two cylindrical members 4a, 4b to each other and allowing the cylindrical members to move relatively to each other, the distance between the frame and the eye member can be freely adjusted as illustrated in FIG. 8. In this embodiment a scale can be provided on the side of the smaller cylindrical member 4b so that the magnification can be read at a glance. When the simulation device is not in use, it can be reduced to the smallest size by driving the two cylindrical members to the fullest extent to each other.

The simulation device described above can be manufactured easily from wood, plastic, metal, or cardboard paper, for example.

With the simulation device of this invention, even an unskilled user is enabled to determine easily in advance whether or not a slide film or motion-picture film to be produced will be suitable for projection in a place of prescribed conditions. Depending on the results of the determination, he is enabled to produce a projection film which will reproduce a perfectly discernible image on the screen. Thus, this invention provides outstanding utility and great convenience.

When letters in the original are small or a graph drawn therein is complicated, it is not easy to tell whether or not the image photographed on the film, when projected on a screen, will reproduce an image amply discernible by the viewers. Even in such a case, the simulation device of this invention enables the user to determine this question easily. The device even permits the user to form a fair estimate about the discernibleness of the contents of the image as projected on the screen. It, thus, enables the user to make elaborate selection of the aspect of the image to be contained within the frame of film and consequently produce a projection film promising reproduction of a perfectly discernible image on the screen. Where the image is of an indivisible nature, the simulation device permits the user to find easily how much the image should be enlarged for all the spectators to be able to discern and comprehend its contents. Then, the user can prepare a screen large enough for the intended projection and a projector capable of reproducing a perfectly discernible image on the screen as well as the position for the screen relative to the spectators' seats.

The utility of the simulation device of this invention is not limited to originals prepared in advance for photography. The simulation device can be used also for making the same kind of determination with respect to scenes, objects, persons, etc. Nor is the type of projected image to be simulated limited to those to be projected onto screens using photographic slides, movie film etc. It is also possible simulate TV images, video images etc.

Obviously many modifications and variations of the present invention are possible in the light of the preceding teachings. It is therefore to be understood that within the scope of the appended claims, the invention may be practiced otherwise than as specifically described.

What is claimed is:

1. A device for simulation of projected image, comprising a support member, a frame disposed at one end of said support member substantially perpendicularly to said support member, and an eye member provided with an eye hole and disposed at the other end of said support member substantially perpendicularly to said support member and parallelly to said frame, the inner vertical dimension of said frame being what is obtained by multiplying the vertical dimension of the area of a projected image by the distance between said frame and said eye member and dividing the resultant product by the distance between the surface of the projected image on the screen and the position suitable for observation of the projected image and the inner horizontal dimension of said frame being what is obtained by multiplying the horizontal dimension of the area of the projected image by the distance between said frame and said eye member and dividing the resultant product by the distance between the surface of the projected image on the screen and the position suitable for observation of the projected image.

2. The simulation device according to claim 1, wherein said support member is constructed to be freely variable in length.

3. The simulation device according to claim 1 or claim 2, wherein said frame is detachably attached to the support member.

4. The simulation device according to claim 1, wherein said frame comprises two L-shaped members opposed diagonally to each other, with one of said two L-shaped members adapted to be moved relative to the other L-shaped member.

5. The simulation device according to claim 1, wherein said frame comprises one L-shaped member and two arm members adapted to be movably attached one each perpendicularly to the vertical arm and the horizontal arm of said L-shaped member.

6. The simulation device according to any of claims 1, 2, 4, and 5, wherein the frame and the eye member are attached to the support member so as to be folded over the support member.

7. The simulation device according to claim 1, wherein the frame comprises a transparent plate and a plurality of boundaries of gradually varied areas drawn thereon.

8. The simulation device according to claim 7, wherein the boundaries on the transparent plate are made distinct with different transparent colors.

9. The simulation device according to claim 1, wherein a plurality of frames of gradually varying areas are formed within the frame.

10. The simulation device according to claim 1, wherein a plurality of L-shaped members of gradually varying sizes are disposed within the frame, with the leading ends thereof fastened to the frame.

11. The simulation device according to claim 1, wherein the support member is in the shape of a cylinder.

* * * * *